United States Patent [19]

Fremuth et al.

[11] Patent Number: 4,808,764
[45] Date of Patent: Feb. 28, 1989

[54] METHANOL-GAS SATURATOR FOR CATALYTIC CONVERSION SYSTEM

[75] Inventors: Dietmar R. A. Fremuth, Plainsboro, N.J.; Alan E. Rogers, Wycombe, Pa.; John C. Zahner, Princeton, N.J.

[73] Assignee: Mobil Oil Corporation, New York, N.Y.

[21] Appl. No.: 484,656

[22] Filed: Apr. 13, 1983

[51] Int. Cl.$^4$ .............................................. C07C 1/20
[52] U.S. Cl. .................................. 585/640; 585/315; 585/408; 585/424
[58] Field of Search ............... 585/408, 469, 412, 413, 585/424, 640, 639, 75 M, DIG. 315, DIG. 311, DIG. 314, DIG. 319, DIG. 322; 261/94, 95

[56] References Cited

U.S. PATENT DOCUMENTS

| | | | |
|---|---|---|---|
| 3,931,349 | 1/1976 | Kuo | 585/640 |
| 3,998,899 | 12/1976 | Dariduk et al. | 585/640 |
| 4,044,061 | 8/1977 | Chang et al. | 585/640 |
| 4,418,236 | 11/1983 | Cornelius et al. | 585/7 |

OTHER PUBLICATIONS

Perry, "Chemical Engineers' Handbook", 5th Ed., Chapter 18 (specifically pp. 1,19, and 49).

Primary Examiner—Asok Pal
Attorney, Agent, or Firm—Alexander J. McKillop; Michael G. Gilman; L. G. Wise

[57] ABSTRACT

A process for introducing a exothermic reactant vapor stream to an adiabatic catalyst zone comprising the steps of: preheating a volatile liquid exothermic reactant stream below its autogenous temperature under process pressure; contacting the preheated liquid reactant stream in a saturator unit with a hot diluent gas to vaporize the reactant stream in gaseous mixture with the diluent stream; directing the gaseous mixture from the saturator unit to the catalyst zone for exothermic conversion of the reactant under substantially adiabatic reaction conditions in the presence of diluent gas; recovering reaction products and diluent gas from the catalyst zone; separating diluent gas from the products, compressing and recycling the diluent gas to the saturator unit. Methods and apparatus are provided for use in a continuous catalytic MTG process for making gasoline boiling range hydrocarbons exothermically from a methanol-containing reactant stream diluted with a methane-rich recycle gas stream by contacting the diluted feedstock with a fixed bed of crystalline aluminosilicate zeolite catalyst in an adiabatic reaction zone at elevated temperature and pressure.

The recycle gas may be contacted with the liquid feedstock in a counter-current vertical tower operatively connected through an upper gas outlet to the reaction zone and wherein liquid feedstock flows downwardly under gravity through a saturation zone.

15 Claims, 3 Drawing Sheets

METHANOL-GAS SATURATOR FOR CATALYTIC CONVERSION SYSTEM

FIELD OF THE INVENTION

This invention relates to a process system in which a vaporized liquid feedstock is combined with a recycle or diluent gas to control the temperature rise resulting from the catalytic conversion of the feedstock. In a methanol-to-gasoline (MTG) process employing an acid ZSM-5 type catalyst, excessive reactor temperatures can be prevented by mixing methanol vapor feedstock with a diluent gas, such as recycled light hydrocarbon gas.

BACKGROUND OF THE INVENTION

The catalytic conversion of methanol to gasoline boiling-range components is a highly exothermic reaction releasing approximately 750 BTU of heat per pound of methanol. This amount of heat release will result in an adiabatic temperature increase of several hundred degrees C. for pure methanol feed. In an adiabatic catalyst bed reactor, this large temperature increase will result in high zeolite catalyst aging rates, and possibly cause thermal damage to the catalyst. Furthermore, such high temperatures could cause an undesirable product distribution to be obtained. Therefore, it is critical to the conversion of methanol to gasoline products to provide sufficient heat removing or dissipating facilities so that the maximum temperature encountered in any portion of the zeolite catalyst conversion step is below an upper predetermined limit.

The preferred temperature control technique employs a heat dissipating gasiform material in combination with the reactant charge passed to the crystalline zeolite conversion step. The use of light hydrocarbon gases, $C_5$ and lower boiling material, dilutes the reactant before contacting ZSM-5 zeolite catalyst. By using a proper dilution ratio, the exothermic temperature rise in the ZSM-5 catalyst system is readily controlled within desired practical limits. The light hydrocarbon gases thus employed are easily separated from the higher boiling gasoline boiling components and can be recycled to the reactor inlet as diluent.

Typical MTG processes utilizing the acid ZSM-5 type catalysts are disclosed in U.S. Pat. Nos. 3,998,899, 4,052,479, 4,138,440 and 4,304,951, incorporated herein by reference. The fresh feedstock methanol is usually provided as a crude liquid containing a major amount of methanol, a minor amount of water and trace amounts of hydrogen, carbon oxides, lower hydrocarbons, and dissolved inert gas. Since the conversion reaction takes place in vapor phase at elevated temperature and pressure, a considerable amount of thermal energy must be transferred to the feedstock. In typical prior systems such as described by Lee in "Synergy", Vol. 2, No. 1, pp. 5-11, 1982, published by Mobil Research & Development Corp., the methanol evaporating and superheating steps have required a large heat exchange section and substantial pressurization of fresh feedstock prior to mixing with compressed recycle gas.

When the vapor phase methanol feedstock is contacted with active HZSM-5 catalyst at reaction temperature, e.g. about 355° C. to 370° C., it should contain a significant amount of diluent gas to prevent temperature excursion in the catalyst bed.

Complete failure of recycle gas in a single conversion MTG reactor leads to an adiabatic temperature rise of about 500° C. Due to high catalyst activity, unacceptable temperatures may be reached in the upper parts of the bed within minutes. Catalyst deactivation from the elevated temperatures tends to magnify the temperature excursion in the downstream portions of the bed.

Ratio feed control can be employed to provide mixing of the gaseous reactant and diluent streams; however, failure of such a control system might result in dumping a deleterious amount of methanol vapor into the conversion reactor under potentially dangerous conditions. Although an emergency shut-down system could be employed to cut off the methanol fuel and cool the overhead equipment with standby propane or the like, normal operations would be suspended and capital cost increased. The possibility of an uncontrolled temperature excursion in the MTG reactor leads workers in this field to reduce the likelihood that methanol can reach the active catalyst in the absence of diluent. Improved heat transfer systems and techniques for improving the energy recovery for feedstock conditioning have also been sought.

SUMMARY OF THE INVENTION

The use of a saturator to cause liquid methanol to evaporate and mix with a stream of recycle gas has been found as an alternative to a simple ratio feed control. This technique both improves the heat transfer features of the plant and decreases the likelihood that methanol can be present without recycle gas. Compared with a design using ratio feed control, it reduces the capital investment in reactor effluent heat exchangers and lessens concern over the possibility of an unacceptable temperature excursion in the reactor.

Accordingly, a novel MTG system has been provided for catalytically converting methanol to gasoline boiling range hydrocarbons by contacting methanol in a gaseous stream with an acid crystalline zeolite catalyst of the ZSM-5 type in a reaction system comprising methods and means for:

(a) feeding a circulating heated liquid methanol stream containing the methanol feedstock to a multiphase gas-liquid saturator contact unit at an inlet temperature substantially below the methanol feedstock boiling point under the superatmospheric process pressure;

(b) contacting the methanol feedstock with sufficient compressed recycle gas from the reactor system to vaporize methanol feedstock, thereby forming a gaseous methanol-recycle stream;

(c) heating and introducing the gaseous methanol-recycle stream directly to the ZSM-5 catalytic reactor system to convert methanol to gasoline hydrocarbon product and a gaseous by-product;

(d) cooling reactor system effluent to recover liquid hydrocarbon product;

(e) separating gaseous by-product from the liquid hydrocarbon product;

(f) compressing and recycling gaseous by-product from step (e) to step (b).

Advantageously, the hot reactor system effluent indirectly heats the methanol-recycle stream and the reactor effluent stream further heats the circulating liquid methanol stream.

In the preferred embodiments, the saturator unit is a countercurrent contact tower including a vertical tower having an upper liquid reactor stream inlet above a counter-current packed bed contact section, a lower diluent gas inlet, an upper gas outlet for removing vaporized reactant in mixture with diluent gas, and a lower liquid outlet for unvaporized reactant, whereby reactant vapor can enter the catalyst zone only with recycled diluent gas. Unvaporized reactant from the saturator unit is mixed with the liquid reactant feedstock to constitute a stream having a total mass flow rate about 5 to 20 times greater than the methanol feedstock. In a typical process employing this invention, inlet liquid stream consists essentially of methanol at least 55° C. below its boiling point, and the diluent gas comprises light hydrocarbons and possibly some hydrogen. Preferably, the catalytic reaction product comprises gasoline boiling range hydrocarbons and the diluent gas comprises at least 50 mole percent methane. These and other objectives, advantages and features of the invention will be shown in the following description and in the drawing.

THE DRAWING

DESCRIPTION OF PREFERRED EMBODIMENTS

The preferred reactant feedstock consists essentially of pure methanol ($CH_3OH$) or crude methanol containing a minor amount of water or other non-deleterious components, such as produced by conventional catalytic methanol synthesis from syngas ($CO+H_2$) or the like. However, the reactant feedstock may include the $C_1$ to $C_3$ alkanols or other volatile lower aliphatic oxygenated hydrocarbons such as alkyl ethers capable of being vaporized by recycled diluent gas and converted by ZSM-5 type catalysts. The specific design cases herein are based on crude synthetic methanol containing about 81 wt.% $CH_3OH$ and 17% $H_2O$. This feedstock is available at a moderate temperature from about ambient to about 70° C. and pressure of 15 to 30 atmospheres. The usual system pressure is about 24 atmospheres (350 psia).

Figure 1:
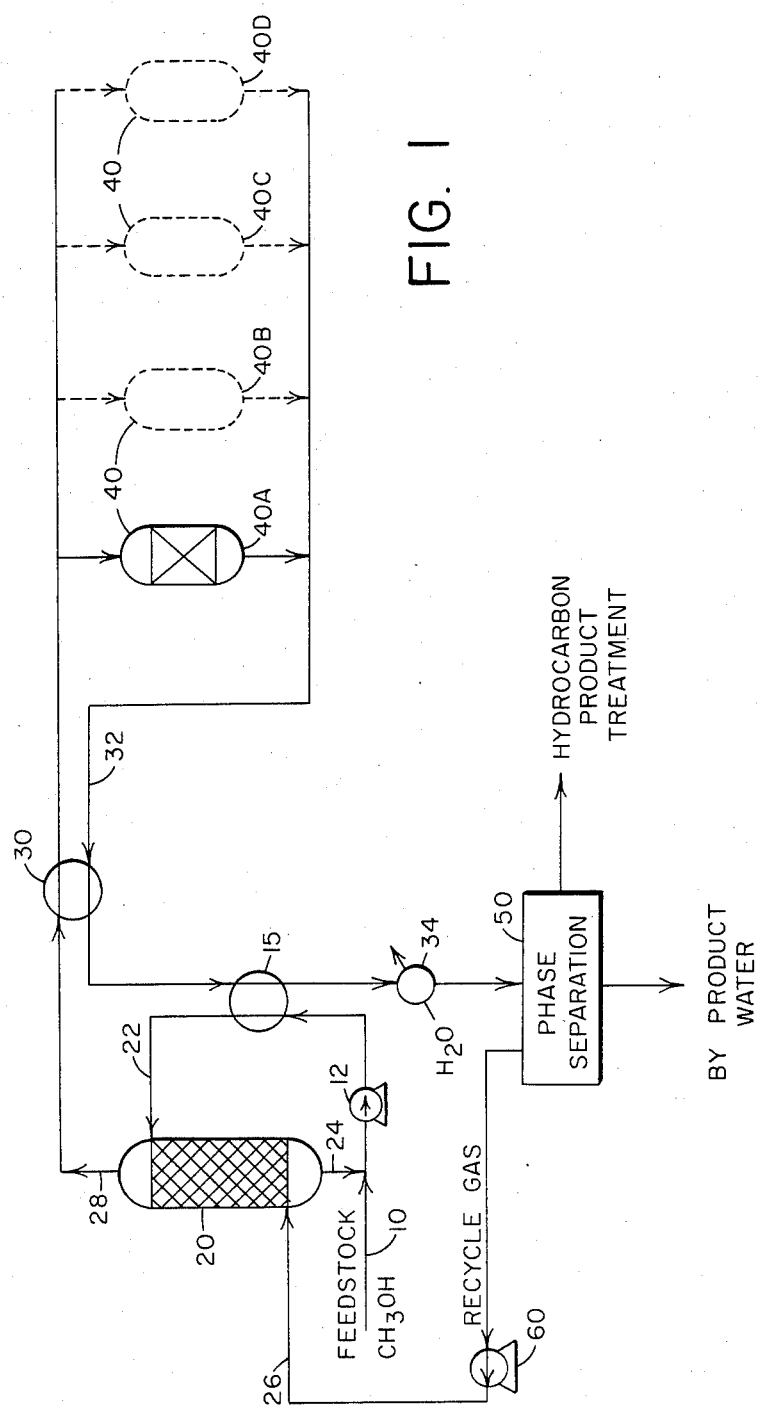
FIG. 1 is a schematic representation of the improved MTG system, with the methanol saturator unit shown in a typical process flow diagram.

Referring to FIG. 1, fresh liquid feedstock is pumped under pressure through makeup line 10 and circulated by pump 12 through a heat exchanger unit 15 to saturator unit 20 through inlet 22. From ambient temperature, the makeup stream is warmed by mixing with excess unvaporized liquid withdrawn from saturator 20 through liquid outlet 24. After passing through exchanger 15, the liquid methanol stream is preferably at least 55° C. below its autogenous boiling point under process conditions. The autogenous temperature at process pressure of about 24 atmospheres may permit preheating the methanol feedstream to about 105° to 150° C. Under the preferred process conditions, unvaporized reactant from the saturator unit is mixed with makeup liquid reactant to constitute a reactant feedstream having a total mass flow rate about 5 to 20 times greater than the makeup liquid. The preferred circulating liquid; makeup ratio is about 5:1 to 10:1.

In the saturator unit the relatively low partial pressure of methanol in the gaseous phase permits liquid methanol to evaporate below its autogenous temperature. The liquid phase flows by gravity downwardly through a packed bed, grid plates contact trays or other suitable gas-liquid contact apparatus, with compressed recycle gas flowing upwardly from a gas inlet 26 countercurrently. The recycle gas may be at a lower temperature than the methanol feedstream, e.g., from about 50° C. to 70° C., and is then heated by hot liquid in the saturator unit and recovered as a saturated stream at about 90° C. to 100° C. through upper gas outlet 28.

The methanol-recycle gaseous mixture is then passed to heat exchanger 30, where it recovers a portion of the reaction exotherm from the reactor effluent stream 32. The heated methanol-recycle mixture is then contacted directly with the catalyst bed in reactor system 40, which may include multiple parallel fixed bed reactors 40A, 40B, 40C, 40D. Additional heat exchangers, furnaces and/or cooling units may be employed as needed to achieve the necessary thermal conditions for optimum process operation.

The reactor effluent stream 32 is cooled in heat exchanger 15 and with cooling water in cooler 34 to condense byproduct water and higher hydrocarbons, including the $C_6+$ aromatic and aliphatic gasoline-range hydrocarbons. In phase separation unit 50, the liquid hydrocarbon product stream is recovered for direct use or subsequent treatment. Byproduct water is also removed as a liquid at this point in the system. The remaining gas system, which may include $H_2$, $CH_4$ and varied amounts of other light gases is separated from the liquid phases. At least a portion of the light gases are recovered and passed through compressor 60, where the gas is heated adiabatically and returned to the saturator unit 20.

The gaseous mixture from the phase separator unit 50 may be fractionated to recover $C_3$–$C_4$ (LPG) product, ethane-rich fuel gas, etc. Additional gas stream component, such as hydrogen, nitrogen, etc. may be removed from the system by conventional gas separation methods, including pressure swing adsorption.

Saturation Unit

Design techniques for a countercurrent saturator tower unit are described by Sze and Campagnolo in *Chemical Engineering Process*, March 1956, pp 121–6M, incorporated herein by reference. Design criteria should be chosen to accommodate a wide range of gas to liquid ratios and for changes in stream composition. Little variation would be expected in the crude liquid methanol feedstock; however, the light gas composition of the recycle stream can be changed markedly within the operating parameters of industrial MTG plants. The methanol saturation curves at various operating temperatures and pressures can be determined for design purposes.

The first known commercial scale MTG plant has been designed for about 15000 barrels per day of liquid gasoline and LPG product. A suitable saturator tower for such a plant would be able to handle about 17500 pound-moles per hour of crude makeup methanol having a composition set forth in Table I. Preferably, the mole ratio (approx. gas volume) of recycle gas to methanol is about 5:1 to 15:1, with optimum process conditions usually being achieved at about 9:1 to 13:1. A typical MTG recycle gas composition is shown in Table I. A specific design case with six theoretical contact stages is summarized in Table I.

TABLE I
COMPOSITION OF THE RECYCLE GAS, METHANOL FEED, AND THE SATURATOR LIQUID OUTLET

| Material | Recycle Gas Pound-Moles/hr | mole % | wt. % | Methanol Feed Moles/hr | wt. % | Saturator Liquid Outlet Moles/hr | wt. % |
|---|---|---|---|---|---|---|---|
| $H_2$ | 15955 | 10.1 | 0.73 | 25 | 0.01 | 14 | 0.001 |
| $CH_4$ | 72836 | 46.2 | 26.64 | 96 | 0.31 | 63 | 0.04 |
| CO | 2783 | 1.8 | 1.78 | 3.5 | 0.02 | 2.4 | 0.003 |
| $CO_2$ | 34632 | 21.9 | 34.75 | 140 | 1.24 | 30 | 0.05 |
| $N_2$ | 963 | 0.6 | 0.62 | 1.8 | 0.01 | 0.8 | 0.001 |
| $C_2H_4$ | 463 | 0.3 | 0.30 | — | 0.00 | 0.4 | 0.0004 |
| $C_2H_6$ | 3826 | 2.4 | 2.62 | — | 0.00 | 3.3 | 0.004 |
| $C_3$'s | 11312 | 7.2 | 11.35 | — | 0.00 | 10 | 0.02 |
| $C_4$'s | 9777 | 6.2 | 12.92 | — | 0.00 | 8 | 0.02 |
| $C_5$'s | 3268 | 2.1 | 5.35 | — | 0.00 | 2.8 | 0.01 |
| $C_6^+$ | 1292 | 0.8 | 2.65 | — | 0.00 | 0.4 | 0.003 |
| $CH_3OH$ | — | — | — | 12585 | 81.15 | 43970 | 51.04 |
| $H_2O$ | 711 | 0.4 | 0.29 | 4653 | 16.87 | 66060 | 43.12 |
| Other | — | — | — | 32 | 0.39 | 2121 | 5.69 |
| Totals | 157818 | 100.0 | 100.00 | 17536 | 100.00 | 112286 | 100.00 |

Figure 2B:
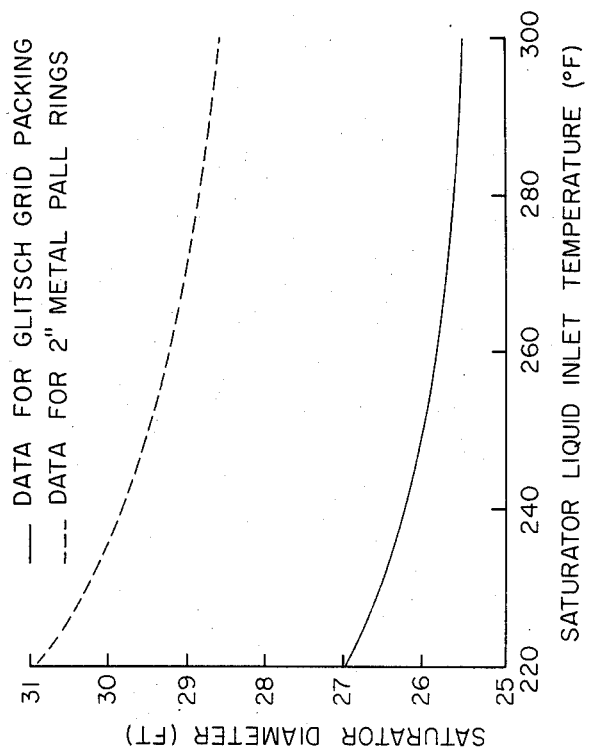
FIG. 2B is a graphic plot of saturator diameter vs. liquid inlet temperature.
Figure 2A:
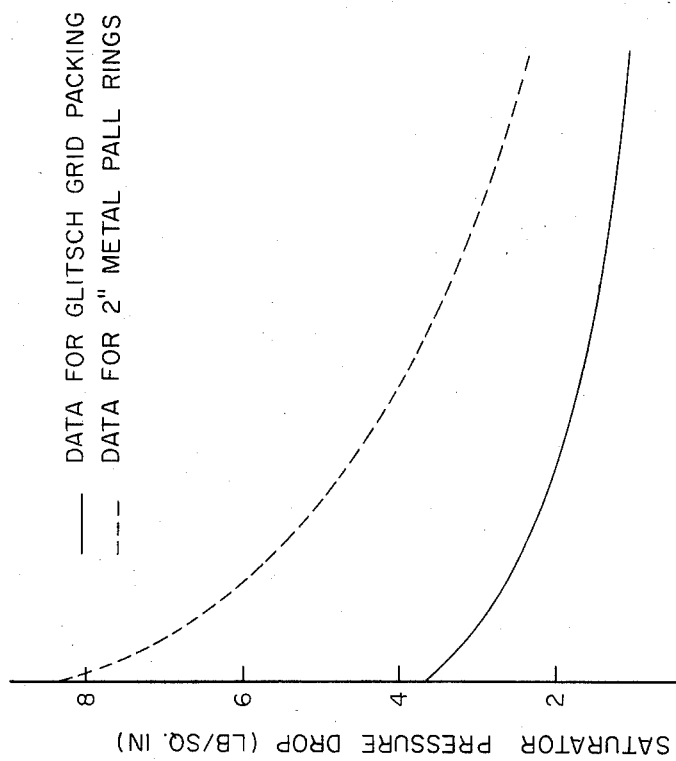
FIG. 2A is a graphic plot of saturator unit pressure drop vs. liquid inlet temperature for a typical design case.

A suitable vertical saturator tower to accommodate the mass flow rates of the above methanol and recycled streams would require a tower diameter of about 8 to 10 meters and a packing height of about 12 meters to achieve six theoretical stages for Glitsch Grid packing. The effects of different types of packing are shown in FIGS. 2A and 2B. The two packings compared are Glitsch Grids and the more conventional 2 inch Pall rings (slotted metal rings). Pressure drops for 6 theoretical stages are shown in FIG. 2A (Glitsch Grids require about 2 meters of bed height, for a total of 12 meters; Pall rings require about 1 meter of bed height per theoretical stage, for a total of 6 meters. Although a bed filled with Glitsch Grids is twice as tall as one filled with Pall rings, the total pressure drop across the whole tower is less than one half of that when Pall rings are used, and more importantly, the tower diameter is about 3 ft to 4 ft smaller for the Glitsch Grid packing.

For the Glitsch Grids, the pressure drop through the packing is quite low, from about 7 to 27 kPa (1 to 4 psi) depending on the inlet temperature. For the 2" Pall rings the pressure drop is twice that as for the Glitsch Grid packing, from about 14 to 55 kPa (2 to 8 psi). The reduced tower diameter and pressure drop for the Glitsch Grid definitely favor it for packing material.

Definite heat exchange advantages are obtained using the methanol saturation unit, as compared with vaporizing the makeup feedstock directly. The prior method required higher input temperatures and thus an auxilliary heat exchanger to provide the same amount of thermal energy. The present design permits savings about 30% on heat exchanger area for the overall MTG system, which is reflected in markedly lower construction costs.

Figure 3:
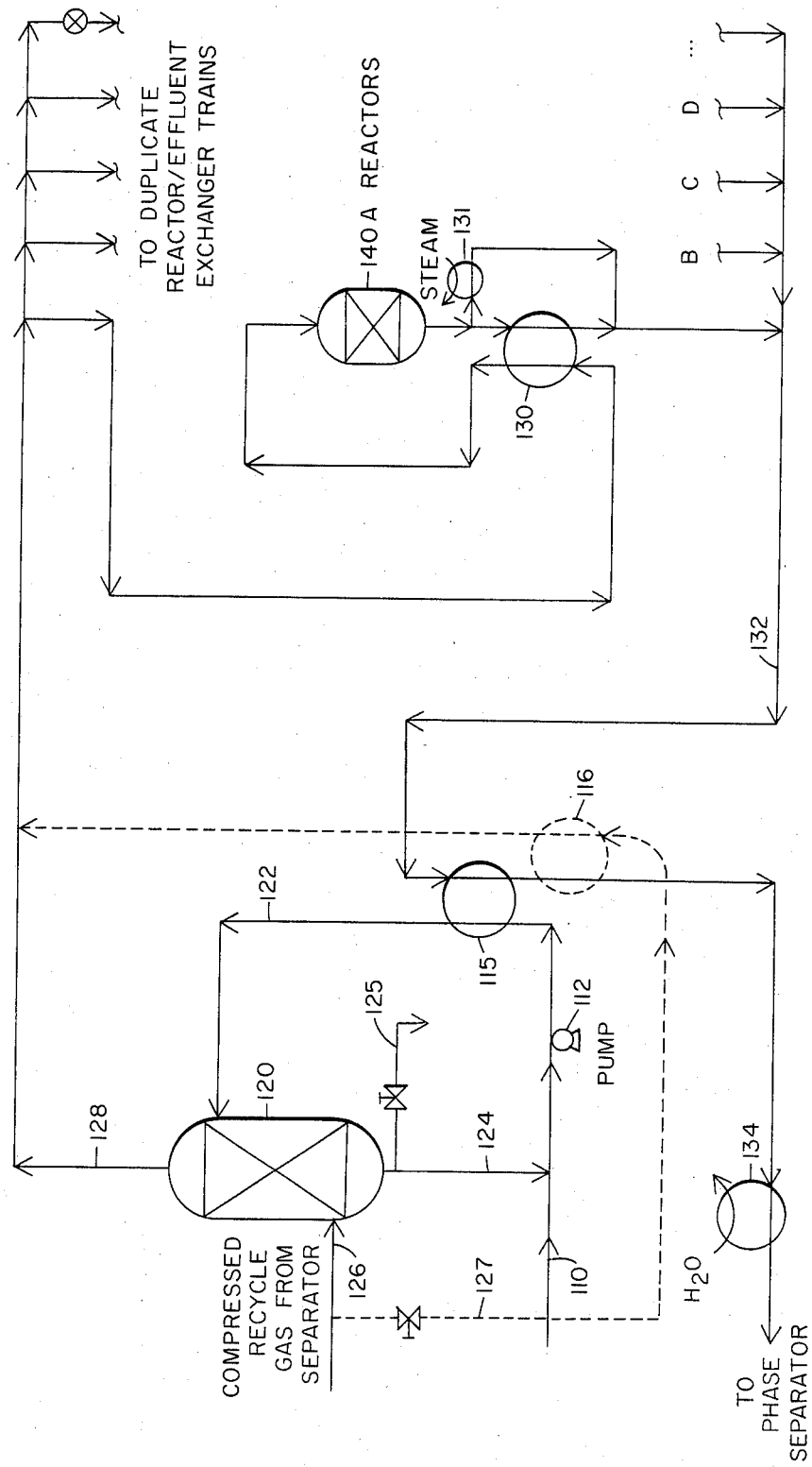
FIG. 3 is a modified system showing an optional recycle bypass.

In FIG. 3 a modified MTG system is shown for the more efficient saturator feed vaporization technique. Analogous to FIG. 1, a saturator 120 receives the preheated methanol feedstream from effluent heat exchanger 115. Individual reactor heat loops are shown, with the reactant-recycle gas stream 128 being heated in exchanger 130 before contact with the catalyst bed in reactors 140A, etc. Partial recovery of effluent heat recovery is obtained with steam unit 131.

It may be desired to bypass a minor or major fraction of recycle gas around the saturator unit. The optional design shown in dashed lines in FIG. 3 permits 0 to 75% of the compressed recycle gas to be diverted through bypass line 127, heated in bypass/effluent heat exchanger 116 and combined with the methanol-recycle gaseous mixture from saturator outlet conduit 128. This modification of the system permits a smaller saturator unit to be installed due to decreased gas throughput. Various amounts of non-reactive or non-volatile components in the crude methanol may accumulate in the feedstream being circulated through the saturator unit 120. A blow down line 125 may be used to divert a portion of unvaporized liquid from outlet line 124 for treatment or bleed off.

In the modified system design with 75% bypass of recycle gas, wherein the total mole ratio of recycle gas to methanol is 9:1, the following system conditions are estimated: recycle gas saturator inlet, 68° C. (155° F.), upper saturator liquid inlet, 135°–165° C. (280°–330° F.); upper saturator methanol-recycle outlet, 125°–140° C. (250°–280° F.); lower unvaporized liquid outlet, 65°–105° C. (150°–220° F.); circulated liquid: MeOH feedstock weight ratio 5:1–20:1.

The present system is advantageous in that it permits reactant methanol vapor to be introduced with safety directly to the zeolite catalyst. Prior systems have included an initial dehydration step over alumina catalyst to convert a portion of the methanol to dimethyl ether before contacting the zeolite contact step. Elimination of the dehydration DME reactor also removes an additional pressure drop constraint. The saturator-modified system could be similar in overal loop pressure differential as compared to the standard prior art configuration. The slight pressure drop across the saturator unit can be offset by a simplified fluid handling system with lower valve pressure losses.

By eliminating temperature excursions in the catalytic conversion, some reduction in equipment costs can be realized due to cheaper materials of fabrication, especially steel vessels.

While the invention has been disclosed by particular examples, there is not intent to limit the inventive concept except as set forth in the following claims.

What is claimed is:

1. A process for catalytically converting methanol to gasoline boiling range hydrocarbons by contacting methanol in a gaseous stream with an acid crystalline zeolite catalyst of the ZSM-5 type in a reaction system comprising:

(a) feeding a heated liquid methanol stream to a multi-phase gas-liquid saturator contact unit at an inlet temperature substantially below the methanol feedstock boiling point under superatmospheric process pressure;

(b) contacting the methanol feedstock in a contact tower with sufficient compressed recycle gas from the reactor system to partially vaporize methanol feedstock, thereby forming a gaseous methanol-recycle stream, said contact tower having an upper liquid reactor feedstream inlet above a counter-current contact section, a lower recycle gas inlet, an upper gas outlet for removing vaporized methanol in mixture with recycle gas, and a lower liquid outlet for unvaporized methanol, whereby vaporized methanol can enter the catalyst zone only with recycle diluent gas;

(c) heating and introducing the gaseous methanol-recycle stream directly to the ZSM-5 catalytic reactor system to convert methanol to gasoline hydrocarbon product and a gaseous by-product;

(d) cooling reactor system effluent in heat exchange relationship with the liquid methanol stream in step (a) to heat the liquid methanol and recover liquid hydrocarbon product;

(e) separating gaseous by-product from the liquid hydrocarbon product; and (f) compressing and recycling gaseous by-product from step (e) to step (b).

2. The process of claim 1 wherein substantially the entire gaseous by-product from step (e) is recycled.

3. The process of claim 1 wherein hot adiabatic reactor system effluent indirectly heats the methanol-recycle stream in step (c).

4. A process for introducing an exothermic reactant vapor stream to an adibatic catalyst zone comprising the steps of:

(a) preheating a volatile liquid exothermic reactant stream below its autogeneous temperature under process pressure;

(b) contacting the preheated liquid reactant stream in a saturator unit with a diluent gas to vaporize the reactant stream in gaseous mixture with the diluent stream, said saturator unit comprising a vertical counter-current contact tower having an upper liquid reactant feedstream inlet above a counter-current contact section, a lower diluent gas inlet, an upper gas outlet for removing vaporized reactant in mixture with diluent gas, and a lower liquid outlet for unvaporized reactant, whereby reactant vapor can enter the catalyst zone only with recycled diluent gas;

(c) directing the gaseous mixture from the saturator unit to the catalyst zone for exothermic conversion of the reactant under substantially adiabatic reaction conditions in the presence of diluent gas;

(d) recovering reaction products and diluent gas from the catalyst zone; and (e) separating diluent gas from the products, compressing and recycling the diluent gas to the saturator unit.

5. The process of claim 4 wherein said reactant stream consists essentially of methanol substantially below its boiling point; said diluent gas comprises hydrogen and light hydrocarbons; said catalyst comprises an acid crystalline zeolite.

6. The process of claim 5 wherein methanol is preheated to about 95° to 165° C., the compressed diluent gas enters the saturator unit at about 65° to 70° C., the contact section contains about 6 theoretical contact stages, and the reactant vapor and diluent gas mixture leave the saturator unit at about 80° C. to 140° C., are heated to reaction temperature and contacted with a ZSM-5-type zeolite conclusion catalyst at process pressure of about 17 to 30 atmospheres.

7. The process of claim 1 wherein substantially the entire amount of diluent gas recovered from the catalyst zone is recycled to the saturator unit wherein a packed bed contact section is maintained.

8. The method of claim 4 wherein the reactant stream consists essentially of $C_1$-$C_3$ alkanol and the catalytic reaction product comprises gasoline boiling range hydrocarbons and the diluent gas comprises at least 50 mole percent $C_1$-$C_4$ alkanes.

9. The process of claim 4 wherein unvaporized reactant from the saturator unit is mixed with makeup liquid reactant to constitute a reactant saturator unit feedstream having a total mass flow rate about 5 to 20 times greater than the makeup liquid.

10. The process of claim 6 wherein the weight ratio of recycle gas to methanol vapor leaving the saturator unit is about 5:1 to 10:1.

11. The process of claim 4 wherein the hot reactant vapor and recycle gas mixture from the saturator unit is heated indirectly by reactor effluent from the catalyst zone and passed directly to the catalyst zone at reaction temperature.

12. The process of claim 4 wherein a portion of diluent gas from separation step (e) bypasses the saturator unit and is combined with the gaseous mixture from the saturator unit prior to the catalyst zone.

13. In the continuous catalytic process for making gasoline boiling range hydrocarbons exothermically from a methanol-containing reactant stream diluted with a methane-rich recycle gas stream by contacting the diluted methanol stream with a fixed bed of crystalline aluminosilicate zeolite catalyst having a silica to alumina ratio of at least 12 and a constraint index of about 1 to 12 in an adiabatic reaction zone at elevated temperature and pressure, the improvement which comprises:

contacting hot compressed recycle gas with a countercurrent preheated liquid reactant stream in a packed bed at a temperature substantially below the autogenous temperature of methanol under process conditions to vaporize methanol reactant into the recycle gas stream, thereby providing methanol vapor to the catalyst bed only in the presence of diluent gas.

14. The process according to claim 13 wherein the recycle gas is contacted with the liquid reactant stream in a counter-current vertical tower operatively connected through an upper gas outlet to the reaction zone and wherein liquid feedstock flows downwardly under gravity through a saturation zone.

15. A process for catalytically converting methanol to gasoline boiling range hydrocarbons by contacting methanol in a gaseous stream with an acid crystalline zeolite catalyst of the ZSM-5 type in a reaction system comprising:

feeding a heated liquid methanol stream to a multi-phase gas-liquid saturator contact unit at an inlet temperature substantially below the methanol feedstock boiling point under superatmospheric process pressure;

contacting the methanol feedstock in a contact tower with sufficient compressed recycle gas from the reactor system to partially vaporize methanol feedstock, thereby forming a gaseous methanol-recycle stream, said contact tower having an upper liquid reactant feed-stream inlet above a counter-current contact section, a lower recycle gas inlet, an upper gas outlet for removing vaporized methanol in mixture with recycle gas, and a lower liquid outlet for unvaporized methanol;

feeding vaporized methanol into the catalyst zone only in admixture with recycled diluent gas;

heating and introducing the gaseous methanol-recycle stream directly to the ZSM-5 catalytic reactor system to convert methanol to gasoline hydrocarbon product and a gaseous by-product;

cooling reactor system effluent to recover liquid hydrocarbon product;

separating gaseous by-product from the liquid hydrocarbon product; and compressing and recycling gaseous by-product to the contact tower.

* * * * *